(12) United States Patent
Gailloux et al.

(10) Patent No.: US 10,292,037 B1
(45) Date of Patent: May 14, 2019

(54) MOBILE COMMUNICATION DEVICE AUTOMATED HOME LOCATION REGISTER (HLR) ASSIGNMENT ADAPTATION

(71) Applicant: Sprint Communications Company L.P., Overland Park, KS (US)

(72) Inventors: Michael A. Gailloux, Overland Park, KS (US); Samuel Golomeke, Overland Park, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/472,225

(22) Filed: Mar. 28, 2017

(51) Int. Cl.
*H04W 8/04* (2009.01)
*H04W 4/029* (2018.01)
*H04L 29/08* (2006.01)

(52) U.S. Cl.
CPC ............ *H04W 8/04* (2013.01); *H04W 4/029* (2018.02); *H04L 67/306* (2013.01)

(58) Field of Classification Search
CPC ....... H04W 8/04; H04W 4/029; H04W 4/028; H04L 67/306
See application file for complete search history.

(56) References Cited

U.S. PATENT DOCUMENTS

| | | | | |
|---|---|---|---|---|
| 8,892,126 B2 * | 11/2014 | Busch | ................. | H04W 4/029 455/456.1 |
| 9,084,013 B1 * | 7/2015 | Arini | ................. | H04N 21/44204 |
| 2002/0035605 A1 * | 3/2002 | McDowell | ............. | H04L 29/06 709/206 |
| 2003/0008644 A1 * | 1/2003 | Akhterzzaman | ........ | H04M 3/02 455/418 |
| 2006/0126556 A1 * | 6/2006 | Jiang | ....................... | H04L 12/18 370/328 |
| 2008/0285544 A1 * | 11/2008 | Qiu | .................... | H04L 29/12311 370/352 |
| 2011/0035255 A1 * | 2/2011 | Dasher | .................. | G06Q 30/02 705/14.72 |
| 2012/0041856 A1 * | 2/2012 | Narkar | .................. | G06Q 30/04 705/34 |
| 2013/0040603 A1 * | 2/2013 | Stahlberg | ............. | H04L 63/126 455/410 |
| 2014/0006142 A1 * | 1/2014 | Gaudet | ................. | G06Q 50/01 705/14.45 |
| 2014/0155177 A1 * | 6/2014 | Crossley | ............... | G06Q 10/00 463/43 |

(Continued)

*Primary Examiner* — Mehmood B. Khan (57) ABSTRACT

A method of adapting assignment of user equipments (UEs) to home location registers (HLRs) in a wireless communication network. The method comprises receiving location messages from a UE by an application executing on a computer system, where each of the location messages comprise information about a location of the UE at a date and time, analyzing the information about the locations of the UE by the application, selecting a HLR assignment rule based on a user profile associated with the UE by the application, applying the selected HLR assignment rule to the analysis of the information about locations of the UE by the application to determine a preferred HLR in the wireless communication network for the UE, and reassigning the UE from a previously assigned HLR to the preferred HLR by the application.

12 Claims, 7 Drawing Sheets

(56) References Cited

U.S. PATENT DOCUMENTS

| | | | |
|---|---|---|---|
| 2016/0092935 A1* | 3/2016 | Bradley | G06Q 30/0276 |
| | | | 705/14.72 |
| 2016/0104187 A1* | 4/2016 | Tietzen | G06Q 30/0233 |
| | | | 705/14.33 |
| 2016/0112522 A1* | 4/2016 | Abello | H04L 67/22 |
| | | | 709/224 |
| 2016/0171542 A1* | 6/2016 | Fanous | G06F 17/30867 |
| | | | 705/14.54 |
| 2017/0236150 A1* | 8/2017 | Fiderer | G06Q 30/0251 |
| | | | 705/14.49 |
| 2018/0041895 A1* | 2/2018 | Barcala | G08B 21/18 |

* cited by examiner

MOBILE COMMUNICATION DEVICE AUTOMATED HOME LOCATION REGISTER (HLR) ASSIGNMENT ADAPTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Home Location Register (HLR) is a database of wireless communication subscriber information and plays an integral function in cellular wireless communications infrastructure. HLRs, for example, are involved in authorizing user equipments (UEs), for example mobile smart phones, to attach to the radio access network (RAN). The HLRs may store a variety of subscriber information including address, account status, preferences, access rights, services subscribed to, and more. In some contexts the HLR may be referred to in the singular, for example when referring to the HLR functionality or HLR service, but the HLR service may be implemented by a plurality of HLR nodes at different locations.

SUMMARY

In an embodiment, a method of adapting assignment of user equipments (UEs) to home location registers (HLRs) in a wireless communication network is disclosed. The method comprises receiving location messages from a UE by an application executing on a computer system, where each of the location messages comprise information about a location of the UE at a date and time, analyzing the information about the locations of the UE with reference to date and time by the application, and selecting a HLR assignment rule based on a user profile associated with the UE by the application, where the user profile comprises one or more of a user age, a user marital status, a user postal address, a user billing address, a user postal address type, a user billing address, and a primary subscriber of a wireless communication service account associated with the UE. The method further comprises applying the selected HLR assignment rule to the analysis of the information about locations of the UE by the application to determine a preferred HLR in the wireless communication network for the UE and reassigning the UE from a previously assigned HLR to the preferred HLR by the application.

In another embodiment, a method of restricting announcements transmitted to user equipments (UEs) based on a geographical location constraint is disclosed. The method comprises receiving location messages from a UE by an application executing on a computer system, where each of the location messages comprise information about a location of the UE at a date and time, analyzing the information about the locations of the UE with reference to date and time by the application, receiving a definition of a geographical location constraint for an announcement campaign, and mapping the definition of the geographical location constraint to a set of cell towers in a radio access network (RAN) of a wireless communication service provider that provides service to the UE by the application. The method further comprises determining by the application that a service subscriber associated with the UE satisfies a target profile defined by the announcement campaign, determining by the application that the UE satisfies the geographical location constraint for the announcement campaign based on analyzing the information about the locations of the UE with reference to date and time and based on the mapping of the constraint to the set of cell towers in the RAN of the wireless communication service provider that provides service to the UE, and, after determining that the service subscriber satisfies the target profile and that the UE satisfies the geographical constraint, sending an announcement associated with the announcement campaign to the UE.

In yet another embodiment, a user equipment (UE) is disclosed. The UE comprises a cellular radio transceiver, a short-range radio transceiver, a non-transitory memory, a processor, a display, and an announcement application stored in the non-transitory memory. When executed by the processor, the application monitors and logs location information on the UE, where each log entry comprises a location and a time-date value, transmits a plurality of location log entries via the cellular radio transceiver to a computer system, and determines that the UE is communicating via the short-range radio transceiver to a wireless access point (AP). The application further, after determining that the UE is communicating via the short-range radio transceiver to the AP, transmits an internet protocol (IP) address of the AP to the computer system, receives an announcement, and presents the announcement on the display, whereby the application promotes an announcement campaign application executing on the computer system constraining transmission of the announcements to UEs that satisfy a geographical location constraint of the announcement campaign.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for adapting assignment of UEs to HLRs. It is desirable that the subscriber information associated with a UE be stored in an HLR that is close to, rather than far from, where the user of the UE lives, whereby to reduce wireless communication service delays and to increase network efficiency by reducing unnecessary network traffic. For example, if a user lives in Palo Alto, Calif. it is better that the UE associated with that user be assigned to an HLR located in San Francisco, Calif. rather than be assigned to an HLR located in Dallas, Tex. Sometimes a UE is associated with a first HLR that is close to where the corresponding user lives at the time a wireless communication subscription account is opened. If the user later moves, for example moves from Dallas to Palo Alto to attend Stanford University, the UE may continue to be assigned to the first HLR. If the user still later moves from Palo Alto to Washington D.C., for example, the UE may continue to be assigned to the first HLR.

It will be appreciated that keeping track of millions of wireless communication service subscribers' locations over time could be a monumental management task. A naïve approach might delegate this activity to a business unit directly involved with either establishing accounts (customer sales, marketing) or maintaining customer relations (customer care). The system taught herein uses a less intuitive approach which nevertheless offers some advantages. At its heart, the system determines norms on user location and applies predefined rules to determine when a user has changed his or her location, based on comparing current location information with historical norms of user location. This approach entails coming to grips with large amounts of location data for the many subscribers and condensing this large volume of data into user location norms that in some sense summarize or distill the relevant location information, at least for the purposes of HLR assignment, of the users. The solution may use either GPS location data or may instead keep track of location based on cell site to which mobile devices are attached to. For some location purposes, such as HLR assignment or reassignment, locating a mobile communication device to the service cell sites may be sufficiently precise, which is a way for the system to manage the complexity of the problem solution and make it more tractable. It is noted that reliance on billing address may be misleading in some cases, for example in the case of college students away from the billing address (parents' home) for most of the year or for dual-residence individuals. The use of the automated system taught herein overcomes the management challenges of monitoring this via what may be considered conventional methods. The use of rules that are adapted to different lifestyles and/or categories of subscribers further improves the determination of likely residence of the user. Said in other words, the use of rules adapted to different lifestyles and even to the norms of individuals can reduce errors in HLR reassignment. An improvement to the computer system is established by not treating all subscribers and/or users in the same way but by adapting the system based on the tracking of norms for the subscribers.

The present disclosure teaches a system that infers the user has moved—in the above example, first from Dallas to Palo Alto and second from Palo Alto to Washington D.C.—based on developing norms of UE location reports for that user and applying HLR assignment rules to that user's location norms (it is understood that the location of the user is deemed to be that of his or her UE—the location report of the UE is a proxy for the location of the user). Thus, the system may detect that the user has moved to Palo Alto and assign the UE to the San Francisco HLR and detect that the user has later moved to Washington D.C. and assign the UE to an HLR located in Reston, Va.

The rules for evaluating assignments of HLRs may be applied to the location norms periodically, for example once per month, once per quarter, once per year, or some other period of time. The location norms, also, may be recalculated periodically, either on the same period that the HLR assignment rules are applied or on a different periodic basis. Different rules may be applied to different subscribers or UEs. For example, a pattern of location norms for a married working adult with children may indicate different things than the same pattern of location norms for a college age young man or young woman. For example, an abrupt change in location norms for a college age young man or young woman to indicate much time spent in Palo Alto may correlate with moving to Palo Alto to study at Stanford University. The same abrupt change in location norms for a married man with children may indicate he has been sent on a temporary business assignment to the area of Palo Alto which is a technology hotbed. These different possible explanations for location norm disruption can be incorporated into the rules for assigning HLRs, where each rule may be associated with a specific category or user profile (e.g., a first HLR assignment rule for a college age person, a second HLR assignment rule for a married person with children).

Various announcements may be desired by third parties to be sent to the UEs, for example mobile advertisements, political messages, and the like, that the third parties desire to be restricted based on a geographical location constraint. For example, a candidate for the U.S. House of Representatives running in the $3^{rd}$ District of Texas may wish for his or her political announcements to be delivered to users who reside in the $3^{rd}$ District of Texas and hence have a chance of voting for him or her and to exclude delivering these same political announcements to users who reside well outside of the $3^{rd}$ District of Texas and hence cannot possibly vote for him or her. The norming of location information described above and the application of rules can be applied advantageously to this situation.

The location information norms can capture location patterns related to time and date to distinguish between a likely work location and a likely private residence location. Some announcements by some third parties may wish to restrict sending announcements to UEs based on an estimation of private residence location. Other announcements by some third parties may wish to restrict sending announcements to UEs based on an estimation of work location. The rules for applying geographical location constraints when sending out announcements can be created to extract the desired location discrimination that is specified by the third party requesting announcements to be transmitted to the UEs. In an embodiment, the third party may engage a wireless communication service provider to send announcements to a selected or targeted audience based on geographical location constraints and also based on demographic filter criteria and/or behavioral filter criteria.

A system to support both automated HLR assignment and geographically restricted announcement distribution is taught herein. The system includes a data store of cell sites and coverage areas of cell sites. The coverage areas stored in the cell sites data store may be determined by a network infrastructure application. The location reports of UEs may designate, at least in some cases, location in terms of a cell site to which the UE is attached at a date and time. A population application executing on a computer system can process the location reports of UEs to determine one or more norms of location for each of the UEs. For example one location norm may be a location norm at all times of day. A second location norm may be a location norm for early morning—for example from 2 AM to 5 AM. A third location norm may be a location norm for day time hours—for example from 10 AM to 3 PM during working week days. The population application can further access an API of the network infrastructure application to ask that a geographical constraint (e.g., defined in geographical terms such as latitude-longitude coordinates or other) be mapped to a set of cell sites that provide coverage over the geographical area defined by the geographical constraint. A campaign application can then determine to send announcements (or not send announcements) to UEs based on the cell sites associated with the geographical area and based on the evaluation rules.

Figure 1:
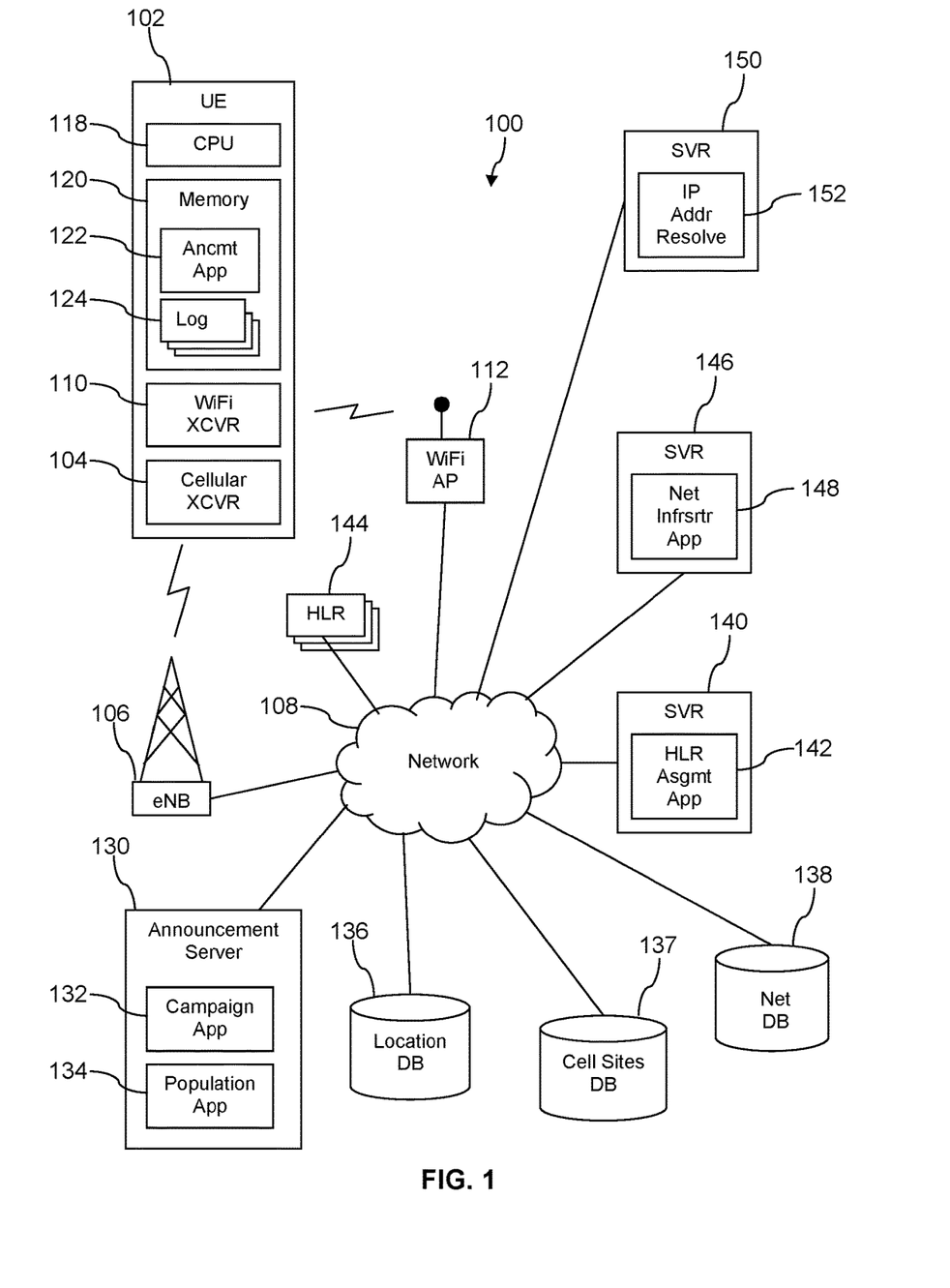
FIG. 1 is a block diagram of a communication system according to an embodiment of the disclosure.

Turning now to FIG. 1, a system 100 is described. In an embodiment, the system 100 comprises a user equipment (UE) 102 having a cellular radio transceiver 104 that is capable of establishing a wireless communication link with a cell site 106. The cell site 106 may communicatively couple the UE 102 to a network 108 and there through to other UEs and communication nodes. The UE 102 may be a mobile communication device. The UE 102 may be a smart phone, a mobile phone, a personal digital assistant (PDA), a media player, a wearable computer, a headset computer, a laptop computer, a notebook computer, or a tablet computer. The cell site 106 may be an enhanced node B (eNB), a base transceiver station (BTS), a picocell, or other cellular communication site. The cell site 106 may provide a wireless communication link to the UE 102 according to one or more of a long term evolution (LTE), a code division multiple access (CDMA), a global system for mobile communications (GSM), or a worldwide interoperability for microwave access (WiMAX) wireless communication protocol. The network 108 may be one or more private networks, one or more public networks, or a combination thereof.

The UE 102 may further have a short range radio transceiver 110, for example a Wi-Fi radio transceiver that is capable of establishing a wireless communication link with an access point (AP) 112. The AP 112 may communicatively couple the UE 102 to the network 108. In some modes of operation, if the short range radio transceiver 110 is able to establish a wireless communication link to the AP 112, the cell site 106 may drop its wireless communication link to the cellular radio transceiver 104, whereby to conserve limited cellular radio bandwidth. The short range radio transceiver 110 may have a radio communication range limitation of greater than 5 feet and less than 1000 feet in most cases while the cellular radio transceiver 104 may have a radio communication range of greater than 1 mile and less than 30 miles. It is understood that the short range radio transceiver 110 may be able to communicate over ranges less than 5 feet. It is understood that the cellular radio transceiver 104 may be able to communicate over ranges less than 1 mile.

The UE 102 comprises a CPU 118 with a memory 120 that stores location logs 124. In an embodiment, the memory 120 may further comprise an announcements application 122. The announcements application 122 may be stored in a non-transitory portion of the memory 120. The UE 102 may occasionally or periodically determine its location and store that location in association with a time-date in a log or log entry. The UE 102 may determine its location and store a log entry at the time that the UE 102 is handed off from a first cell site 106 to a second cell site 106 (e.g., when the UE 102 moves from a coverage area of the first cell site 106 to the coverage area of the second cell site 106). The UE 102 may determine its location periodically, for example every five minutes, every fifteen minutes, every thirty minutes, every hour, or at some other periodic rate. The UE 102 may collect a plurality of location fixes and combine them in a single log entry, for example collecting each coverage handover location fix and/or each periodic location fix performed during a single day and combining them in a log entry for that day. The next day the UE 102 may combine coverage handover location fixes and/or periodic location fixes into a log entry for that next day. The UE 102 may send location logs 124 to a location data store 136 via the network 108 (via either the cell site 106 of the AP 112). In an embodiment, the announcement application 122 may collect the location information from the logs 124 and transmit it to the location data store 136. Alternatively a different application or the operating system of the UE 102 may transmit the location information to the location data store 136.

The location information may identify a cell site 106 to which the cellular radio transceiver 104 is attached. The location information may provide GPS coordinates determined by a GPS receiver (not shown) in the UE 102. The location information may provide an IP address of the AP 112, for example at a time when the short range radio transceiver 110 has a wireless communication link to the AP 112.

In an embodiment, the system 100 may comprise an HLR assignment computer system 140 that executes an HLR assignment application 142. The HLR assignment application 142 analyzes location information stored in the location data store 136, for example location logs 124 sent by a plurality of UEs 102 to the location data store 136, to determine location norms for each of the UEs 102. The location norms may identify a location associated with a UE 102 at different times of the day, for example a workday day time location, a workday night time location, a weekend location. The location norms may comprise a central point and a radius within which the location of a given UE 102 may vary. For example, for some UEs 102, the location may vary within a radius of less than 1 mile. This may correspond to a user who goes to work and stays there all day, usually, and does not ordinarily leave work to go out to lunch or to perform shopping during the noon hour. This may correspond to a user who goes home after the work day is over and rarely goes back out during the work week and does not go out with friends at night during the week. For others, the radius may be determined to be greater, for example at least 5 miles.

The HLR assignment application 142 applies HLR assignment rules to the location norms for each given UE 102 to determine what HLR 144 the UE 102 ought to be assigned to. If the UE 102 is assigned to the determined HLR 144 already, no changed assignment is performed. If the UE 102 is assigned to a different HLR 144, the UE 102 may be assigned to the determined HLR 144 (e.g., the subscriber information associated with the UE 102 is transferred to the determined HLR 144). The processing of the HLR assignment application 142 may evaluate the HLR assignment for a given UE 102 periodically, for example once per month, once per quarter, once per year, or on some other periodic basis. The HLR assignment application 142 may perform this HLR assignment evaluation for many UEs 102 in a wireless communication service provider's network, for example tens of millions of subscribers. In an embodiment, the HLR assignment application 142 may evaluate HLR assignment for all of the UEs 102 in some order and when it has completed the evaluation of HLR assignment immediately restart HLR assignment evaluation at the start of the list (as opposed to evaluating HLR assignment periodically evaluating HLR assignment continuously in this round robin fashion).

For example, data in a first HLR 144 is transferred to a second HLR 144 that is located in a different place from the first HLR 144. Different HLR assignment rules may apply to different UEs 102 based on differences among the profiles of the users or subscribers associated with the UEs 102. Thus, different rules may be applied based on an age and marital status of the users. Different rules may be applied based on special knowledge about the user that may in some cases be available, such as a status of the user as a college student. The rules can take into account vacations away from home. Alternatively, the processing of determining norms may exclude location variations that exceed a threshold for normal variation, for example location variations for transient periods of time consistent with week-long vacations or short business trips.

In an embodiment, the system 100 comprises an announcement server 130 that executes an announcement campaign application 132 and a population application 134. The announcement campaign application 132 executes a plurality of announcement campaigns. Each of the announcement campaigns may define the announcement, such as a video, a textual message, a multimedia message, or other. The announcement campaigns may define a target audience profile. The announcement campaigns may define a number of announcements that are desired to be transmitted via the network 108 and a time duration during which the announcements are expected to be transmitted. The announcement campaigns may further comprise a definition of a geographical constraint that defines one or more geographical areas that the announcement is desirably restricted to. The geographical constraint can define not just an area but a time of day that applies to the constraint. The announcement campaign may be input via an application programming interface (API) of the announcement campaign application 132.

The announcement campaign application 132, when executing one of the announcement campaigns, may select a set of users based on the target audience profile first and then filter that set of users based on the geographical constraint or, alternatively, filter the set of users based on the geographical constraint to define a set of users and then further restrict this set of users based on the target audience profile. In an embodiment, a population application 134 identifies a set UEs 102 that satisfy the geographical location constraint. The population application 134 provides the list of selected UEs 102 to the campaign application 132 for executing the announcement campaign.

The identification of UEs 102 that meet the geographical location constraint may be done in a variety of ways. In an embodiment, a server 146 executes a network infrastructure application 148 that provides an API that receives the definition of the geographical constraint and returns a list of cell sites 106 that cover the area defined by the geographical constraint. The network infrastructure application 148 accesses data about the cell sites 106 including a location of the cell sites 106, the power settings of the RF power amplifiers of the cell site 106, the antenna tilts of the cell sectors of a cell site 106, the RF frequencies utilized by the cell site 106, the wireless communication protocols used by the cell site 106, and other information. The network infrastructure application 148 uses the data on the cell sites 106 in algorithms that estimate a coverage area or coverage extent of the cell sites 106 based on the data about the cell sites 106. The data about the cell sites may be stored in a cell site data store 137. The population application 134 may use the API of the network infrastructure application 148 to obtain a list of cell sites 106 that cover the area corresponding to the defined geographical constraint. The population application 134 may then identify UEs 102 that correspond to the defined geographical constraint by analyzing the location information stored in the location data store 136, where the location information may identify cell sites 106 that the UEs 102 attach to.

The association of UEs 102 to a geographical constraint may be performed by the population application 134 analyzing the location information in the location data store 136 using evaluation rules. The evaluation rules may be defined by a third party that is requesting the announcement campaign, for example by providing the evaluation rule using an interface provided by the campaign application 132 for use in defining and launching an announcement campaign. For example, the campaign application 132 may provide a rule builder tool accessible through an API used by the third party to initiate and launch the announcement campaign. For example, an evaluation rule may specify that 70 percent of the time from 2 AM to 5 AM the UE 106 is located within the defined geographical area (e.g., when trying to establish a residence location pattern). Alternatively, an evaluation rule may specify that the 60 percent of the time from 10 AM to 3 PM on customary workdays the UE 106 is located within the defined geographical area (e.g., when trying to establish a work location pattern). The evaluation rules can be considered to combine both the geographical constraint and, in some cases, a time constraint. In some contexts herein, the term 'geographical constraint' may include both a definition of a geographical area and a time constraint, and the evaluation rules may embody the geographical constraint (both the geographical area and time constraint).

Alternatively, or in addition, the population application 134 may identify UEs 102 that satisfy the geographical constraint by analyzing various information about the UEs 102 or associated with a user of the UEs 102, such as credit card billing addresses, service address, and so on. In an embodiment, some of the location information in the location data store 136 may identify IP addresses of APs 112 to which the UEs 102 attach. The population application 134 may look-up a physical address of some of the UEs 102 by sending the IP address of APs 112 to an IP address resolution application 152 executing on a server 150. The IP address resolution application 152 may then return a physical address (e.g., a postal address or another location format) to the population application 134. The population application 134 may then determine if the subject UE 102, while attached to the APs 112, is in or outside of the area associated with the geographical constraint based on the physical address.

The announcement application 122 executing on the UE 102 may send the announcement server campaign application 132 executing on the announcement computer system 130 a message when the short range radio transceiver 110 established a wireless communication link with the AP 112. The announcement campaign application 132 may monitor this status of UEs 102 and send announcements to UEs 102 currently attached to an AP 112 via the AP.

It is understood that the network infrastructure application 148 may be executed on the announcement server 130 or a different server. The campaign application 132 and the population application 134 may be executed on different servers.

Figure 2:
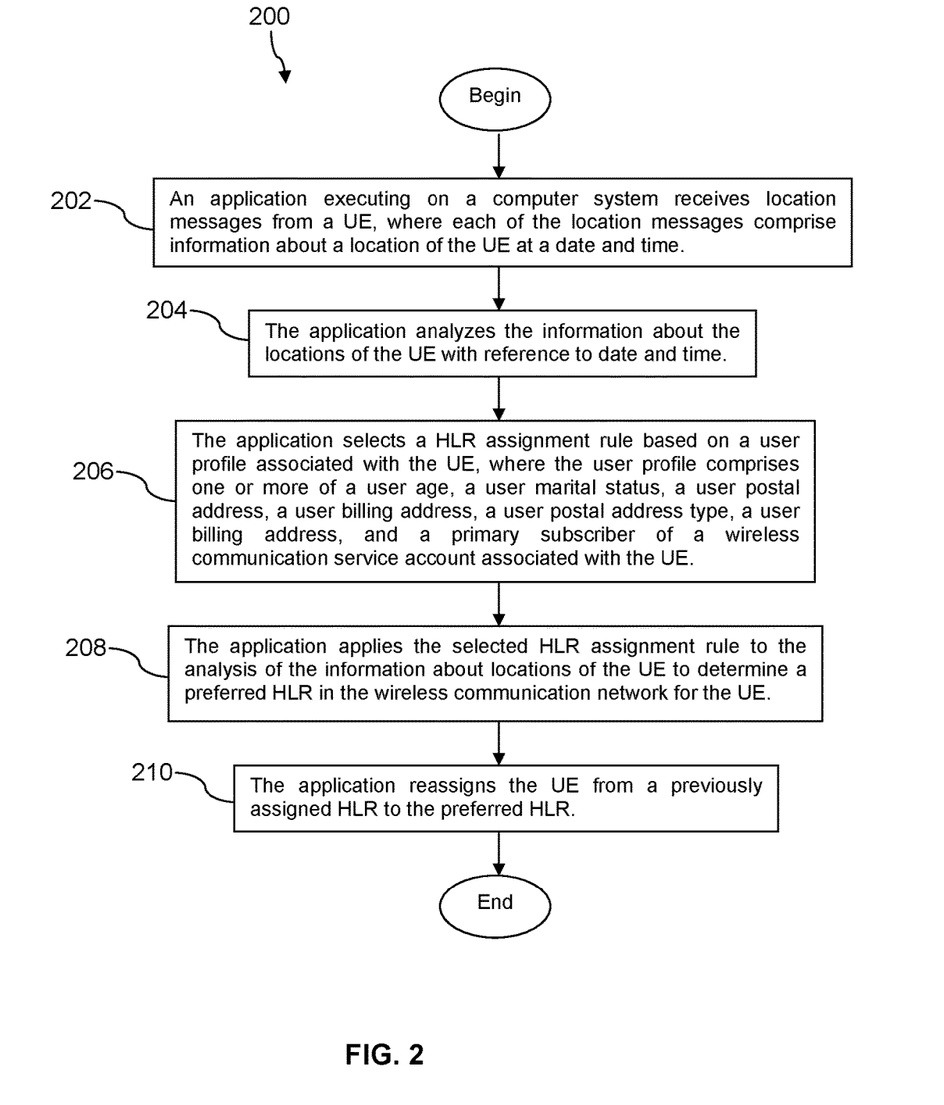
FIG. 2 is a flow chart of a method according to an embodiment of the disclosure.

Turning now to FIG. 2, a method 200 is described. The method 200 may be used to adapt assignments of UEs to home location registers (HLRs). At block 202, an application executing on a computer system receives location messages from a UE, where each of the location messages comprise information about a location of the UE at a date and time. The location information may identify a cell site 106 to which the UE 102 was attached to receive a wireless communication link. The location may identify an IP address of an AP 112 which the UE 102 was communicating through.

At block 204, the application analyzes the information about the locations of the UE with reference to date and time. At block 206, the application selects an HLR assignment rule based on a user profile associated with the UE, where the user profile comprises one or more of a user age, a user marital status, a user postal address, a user billing address, a user postal address type, a user billing address, and a primary subscriber of a wireless communication service account associated with the UE.

At block 208, the application applies the selected HLR assignment rule to the analysis of the information about locations of the UE to determine a preferred HLR in the wireless communication network for the UE. At block 210, the application reassigns the UE from a previously assigned HLR to the preferred HLR.

Figure 3:
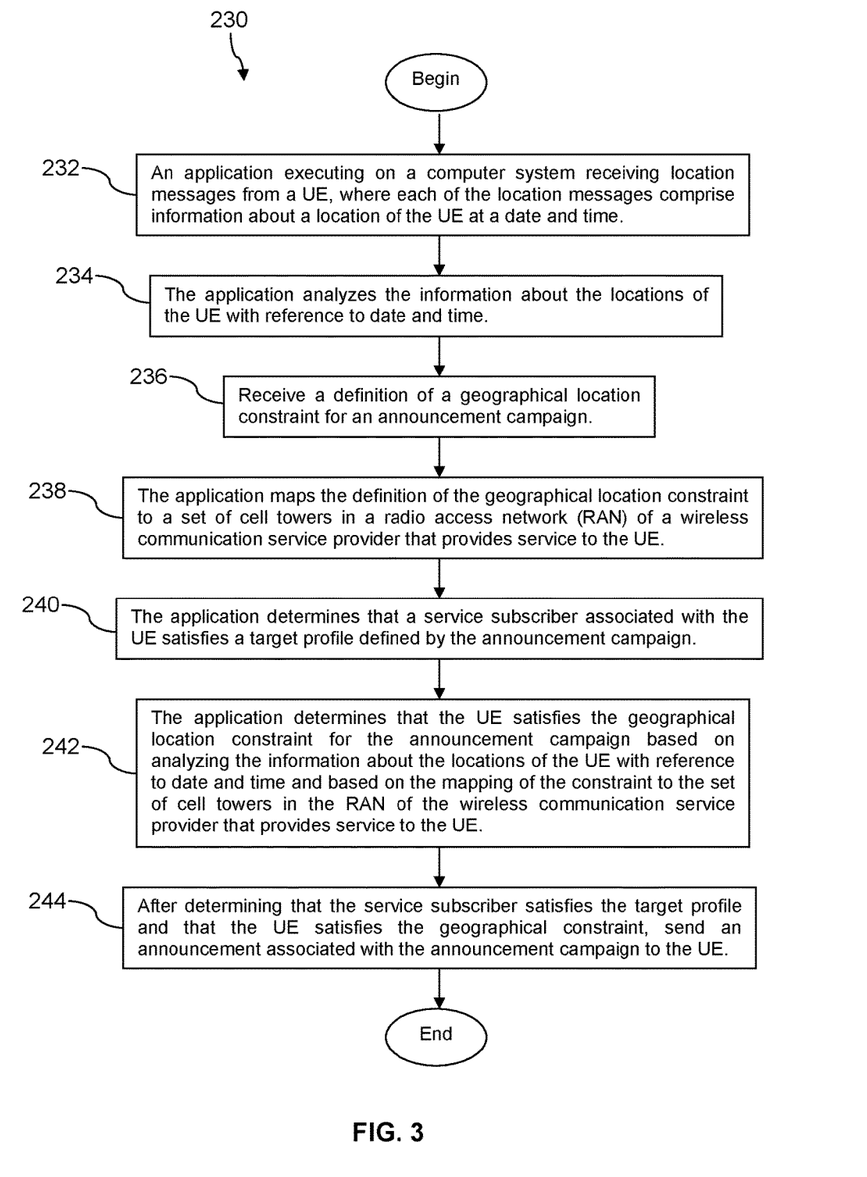
FIG. 3 is a flow chart of another method according to an embodiment of the disclosure.

Turning now to FIG. 3 a method 230 is described. The method 230 may be used to restrict announcements transmitted to UEs based on a geographical location constraint. At block 232, an application executing on a computer system receives location messages from a UE, where each of the location messages comprise information about a location of the UE at a date and time. Some of the location messages may identify a cell site 106 to which the UE 102 is attached, which may be seen as a proxy for the location of the UE 102 (e.g., the UE 102 is located proximate to the subject cell site 106—for example within a radius of 5 miles or less of the cell site 106). Some of the location messages may include GPS latitude-longitude coordinates indicating the location of the UE 102. Some of the location messages may identify an IP address of the AP 112 to which the UE 102 was communicating at the time.

At block 234, the application analyzes the information about the locations of the UE with reference to date and time. For example, the application may determine one or more location norms for the UE 102. The different location norms may be calculated on different selections of location data, for example location data from different periods of time. A first location norm may be determined from location information associated with a period of time from 2 AM to 5 AM. A second location norm may be determined based on location information associated with a 10 AM to 3 PM time during normal work days. A third location norm may be determined based on location information associated with location information associated with any time of day. The location norms may be determined on a selection of a set of location data that satisfies a criteria, for example based on 1 of every 10 of a set of location data associated with a time window (e.g., determining a forth location norm based on every tenth location information associated with a 2 AM to 5 AM time).

At block 236, a definition of a geographical location constraint for an announcement campaign is received. For example, a third party uses an API or user interface to define and enter the geographical location constraint. Geographical location constraint may identify points that define a polygonal perimeter of the geographical area of interest. The user interface may permit the third party to draw a perimeter with an electronic pen on a display of a map and a computer application may translate the perimeter drawn with the electronic pen as a set of points identifying the polygonal perimeter of the geographical area of interest.

At block 238, the application maps the definition of the geographical location constraint to a set of cell towers in a radio access network (RAN) of a wireless communication service provider that provides service to the UE. For example, the application sends a request to the network infrastructure application 148 defining the geographical location constraint, and the network infrastructure application 148 returns a list of cell sites 106 that provide coverage over the defined geographical location constraint. At block 240, the application determines that a service subscriber associated with the UE satisfies a target profile defined by the announcement campaign.

At block 242, the application determines that the UE satisfies the geographical location constraint for the announcement campaign based on analyzing the information about the locations of the UE with reference to date and time and based on the mapping of the constraint to the set of cell towers in the RAN of the wireless communication service provider that provides service to the UE. For example, the application compares the location norms of the UE 102 to the list of cell sites 106. For example, the application evaluates the location norms of the UE 102 versus the list of cell sites corresponding to the geographical location constraint. At block 244, after determining that the service subscriber satisfies the target profile and that the UE satisfies the geographical constraint, sending an announcement associated with the announcement campaign to the UE.

Figure 4:
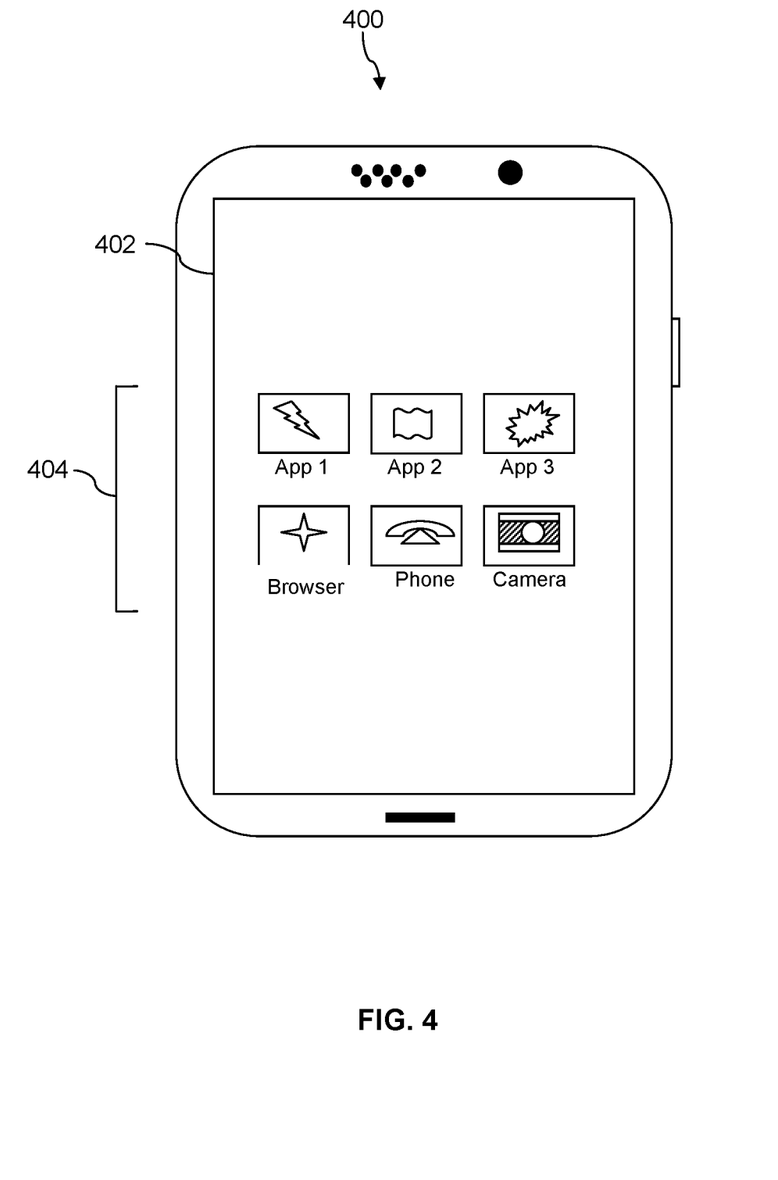
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
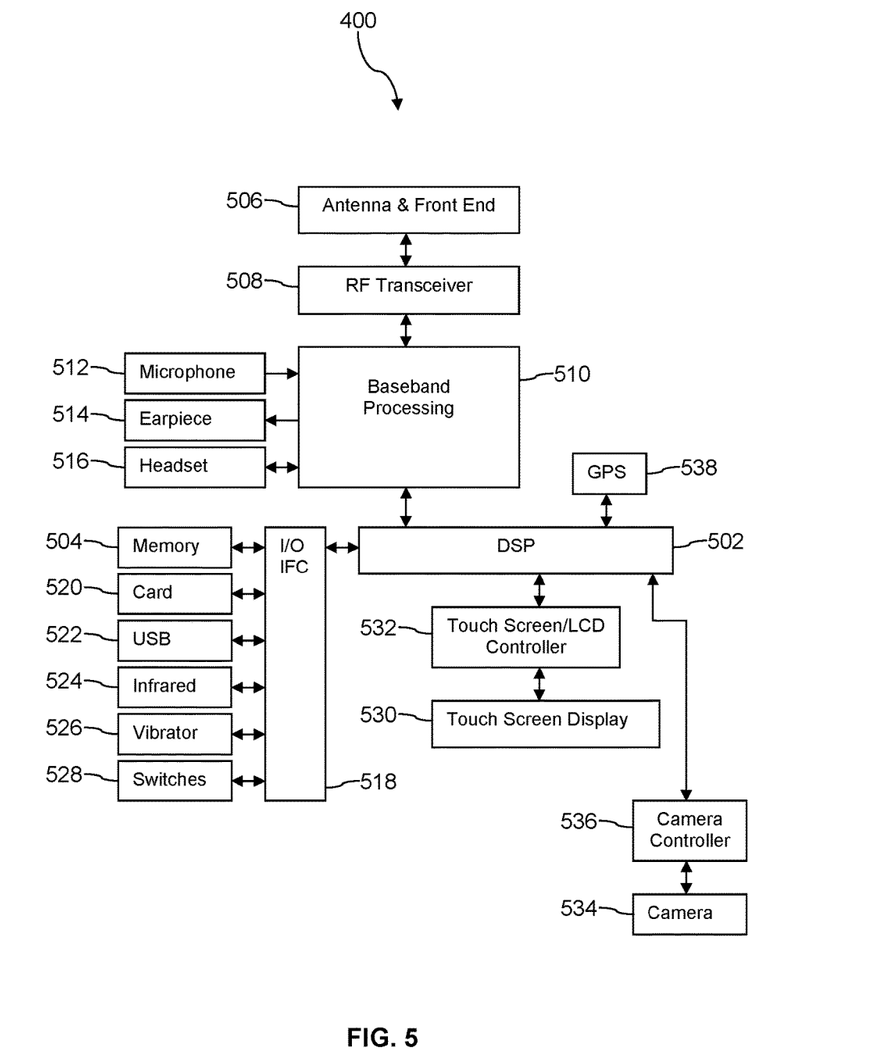
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
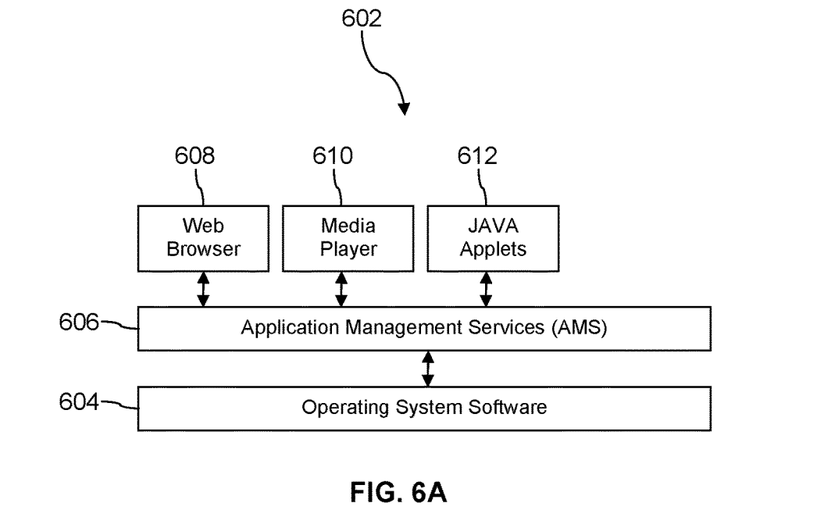
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. In an embodiment, a third party application may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
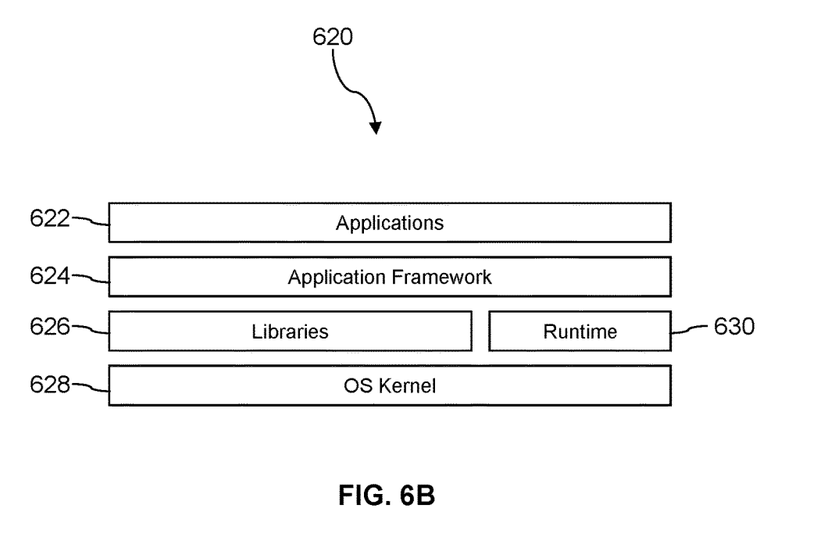
FIG. 6B is a block diagram of a software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
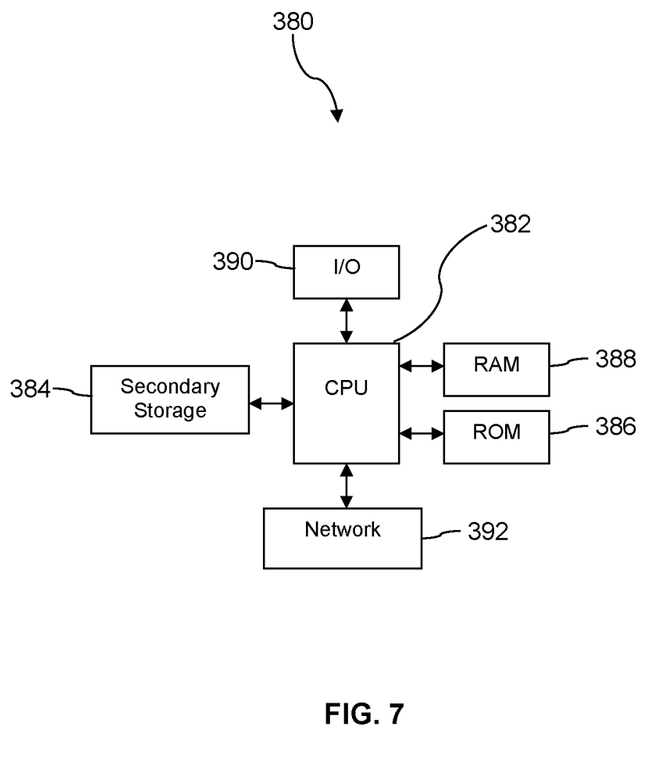
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of restricting announcements transmitted to user equipments (UEs) based on a geographical location constraint, comprising:

receiving location messages from a UE by an application executing on a computer system, where each of the location messages comprise information about a location of the UE at a date and time;

analyzing the information about the locations of the UE with reference to date and time by the application;

determining a plurality of location norms for the UE based on the analysis, wherein the plurality of location norms capture location patterns for the UE over a period of time;

receiving a definition of a geographical location constraint for an announcement campaign;

mapping the definition of the geographical location constraint to a set of cell towers in a radio access network (RAN) of a wireless communication service provider that provides service to the UE by the application;

determining by the application that a service subscriber associated with the UE satisfies a target profile defined by the announcement campaign;

determining by the application that the UE satisfies the geographical location constraint for the announcement campaign based on one or more of the plurality of location norms for the UE and based on the mapping of the constraint to the set of cell towers in the RAN of the wireless communication service provider that provides service to the UE; and after determining that the service subscriber satisfies the target profile and that the UE satisfies the geographical constraint, sending an announcement associated with the announcement campaign to the UE.

2. The method of claim 1, wherein one of the location messages comprises an Internet protocol (IP) address of a wireless access point (AP) that the UE established a wireless communication link to.

3. The method of claim 2, further comprising the application looking up a geographical location based on the IP address of the wireless AP by accessing an IP address resolver service.

4. The method of claim 1, wherein the geographical location constraint specifies both a geographical region and a time of day.

5. The method of claim 4, where the time of day specified in the geographical location constraint specifies being in the geographical location between 2 AM and 5 AM.

6. The method of claim 4, where the time of day specified in the geographical location constrain specifies being in the geographical location between 10 AM and 3 PM on workdays.

7. The method of claim 1, wherein the UE is one of a mobile phone, a smart phone, a personal digital assistant (PDA), a media player, a wearable computer, a headset computer, a laptop computer, a notebook computer, or a tablet computer.

8. A user equipment (UE), comprising:
a cellular radio transceiver;
a short-range radio transceiver;
a non-transitory memory;
a processor;
a display; and
an announcement application stored in the non-transitory memory that, when executed by the processor:
monitors and logs location information on the UE, where each location log entry comprises a location and a time-date value,
transmits a plurality of location log entries via the cellular radio transceiver to a computer system, determines that the UE is communicating via the short-range radio transceiver to a wireless access point (AP),
after determining that the UE is communicating via the short-range radio transceiver to the AP, transmits an internet protocol (IP) address of the AP to the computer system in one of the plurality of location log entries, wherein the locations in the plurality of location log entries including the IP address of the AP are analyzed with reference to the time-date values in the plurality of location log entries, and wherein a plurality of location norms that capture location patterns for the UE over a period of time are determined based on the analysis,
receives an announcement responsive to the UE satisfying a geographical location constraint associated with the announcement based on one or more of the plurality of location norms for the UE, and
presents the announcement on the display.

9. The UE of claim 8, where the UE is one of a mobile phone, a smart phone, a personal digital assistant (PDA), a media player, a wearable computer, a headset computer, a laptop computer, a notebook computer, or a tablet computer.

10. The UE of claim 8, wherein the short-range radio transceiver is a WiFi radio transceiver.

11. The UE of claim 8, wherein the location in a location log entry is indicated by an identity of a cell site.

12. The UE of claim 8, wherein the cellular radio transceiver communicates with a cell site using one of a long-term evolution (LTE), a code division multiple access (CDMA), a global system for mobile communications (GSM), or a worldwide interoperability for microwave access (WiMAX) wireless communication protocol.

* * * * *